US012663127B2

(12) United States Patent
Lu et al.

(10) Patent No.: US 12,663,127 B2
(45) Date of Patent: Jun. 23, 2026

(54) LIGHTING DEVICE WITH A FLEXIBLE CIRCUIT BOARD CONNECTION STRUCTURE

(71) Applicant: Xiamen PVTECH Co., Ltd., Xiamen (CN)

(72) Inventors: Fuxing Lu, Xiamen (CN); Zehu Dai, Xiamen (CN); Huibao Luo, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

(21) Appl. No.: 18/930,978

(22) Filed: Oct. 29, 2024

(65) Prior Publication Data

US 2025/0198580 A1 Jun. 19, 2025

(30) Foreign Application Priority Data

Dec. 18, 2023 (CN) ......................... 202323480844.4

(51) Int. Cl.
*F21S 4/26* (2016.01)
*F21V 23/06* (2006.01)
*F21Y 103/10* (2016.01)

(52) U.S. Cl.
CPC ................ *F21S 4/26* (2016.01); *F21V 23/06* (2013.01); *F21Y 2103/10* (2016.08)

(58) Field of Classification Search
CPC .... F21Y 2103/10; F21V 23/06; F21V 19/001; F21S 4/26
See application file for complete search history.

(56) References Cited

U.S. PATENT DOCUMENTS 6,846,094 B2 * 1/2005 Luk ........................ H05B 45/20 362/240
2005/0162850 A1 * 7/2005 Luk ........................ H05B 45/20 362/227

FOREIGN PATENT DOCUMENTS

KR 20200064399 A * 6/2020 ............. H01L 33/38
WO WO-2023138645 A1 * 7/2023 ........... G02F 1/1336

OTHER PUBLICATIONS

Innovation Q+ NPL Search (Year: 2025).*

* cited by examiner

*Primary Examiner* — Anabel Ton
(74) *Attorney, Agent, or Firm* — BruceStone LLP; Joseph A. Bruce

(57) ABSTRACT

The present invention discloses a lighting device with a flexible circuit board connection structure, which includes a backboard, a plurality of light source board, and a flexible circuit board. The light source boards are fixed to one side of the backboard, and each of the light source boards includes a plurality of electrodes. The flexible circuit board includes a plurality of soldering structures corresponding respectively to the light source boards, and each of the soldering structures includes a plurality of soldering pads. The electrodes of each of the light source boards are respectively soldered to the pads of the soldering structure corresponding thereto.

9 Claims, 8 Drawing Sheets

LIGHTING DEVICE WITH A FLEXIBLE CIRCUIT BOARD CONNECTION STRUCTURE

BACKGROUND OF THE INVENTION

1. Field of the Invention

The present invention relates to a lighting device, in particular to a lighting device with a flexible circuit board connection structure.

2. Description of the Prior Art

The light source boards of currently available LED (Light Emitting Diode) panel light mostly use wire bonding for connections. However, this connection method has some issues. Firstly, the manufacturing process has relatively low production efficiency and results in relatively high manpower costs. The soldering process in the above-mentioned method is relatively complex, which requires longer operation time and the involvement of highly skilled technicians. Secondly, the complexity of this process itself can easily lead to a lower yield rate of panel lights. Furthermore, due to the significant amount of manpower required, this manufacturing method not only imposes high demands on structural design but also makes it difficult to standardize the design, hindering large-scale production.

SUMMARY OF THE INVENTION

One embodiment of the present invention provides a lighting device with a flexible circuit board connection structure, which includes a backboard, a plurality of light source board, and a flexible circuit board. The light source boards are fixed to one side of the backboard, and each of the light source boards includes a plurality of electrodes. The flexible circuit board includes a plurality of soldering structures corresponding respectively to the light source boards, and each of the soldering structures includes a plurality of soldering pads. The electrodes of each of the light source boards are respectively soldered to the soldering pads of the soldering structure corresponding thereto.

Another embodiment of the present invention provides a lighting device with a flexible circuit board connection structure, which includes a cylindrical light cover, a light source board and a flexible circuit board. The light source board is disposed in the cylindrical light cover and includes a plurality of electrodes. The flexible circuit board includes a soldering structure corresponding to the light source board, and the soldering structure includes a plurality of soldering pads. The electrodes of the light source board are respectively soldered to the pads of the soldering structure.

The lighting device with the flexible circuit board connection structure in accordance with the embodiments of the present invention may have the following advantages:

(1) In one embodiment of the present invention, the lighting device includes a backboard, a plurality of light source board, and a flexible circuit board. The light source boards are fixed to one side of the backboard, and each of the light source boards includes a plurality of electrodes. The flexible circuit board includes a plurality of soldering structures corresponding respectively to the light source boards, and each of the soldering structures includes a plurality of soldering pads. The electrodes of each of the light source boards are respectively soldered to the soldering pads of the soldering structure corresponding thereto. Via the flexible circuit board connection structure, both the flexible circuit board and the soldering structures thereof can be standardized to achieve automated production with a view to significantly improving process efficiency and effectively reducing manpower costs.

(2) In one embodiment of the present invention, the lighting device has a flexible circuit board connection structure, and both the flexible circuit board and the soldering structures thereof can be standardized. Therefore, automated production can be achieved, which can effectively reduce the manpower required for the process. Thus, the lighting device can achieve large-scale production to meet actual requirements.

(3) In one embodiment of the present invention, the lighting device has a special flexible circuit board connection structure and the design of the structure is simple, such that several light source boards can be interconnected through one or more flexible circuit boards. In this way, the manufacturing process of the lighting device can be greatly simplified. Therefore, via the flexible circuit board connection structure, the yield rate of the lighting device's manufacturing process can be significantly improved.

(4) In one embodiment of the present invention, the flexible circuit board of the lighting device has a plurality of soldering structures. Each soldering structure has a plurality of soldering pads, and each soldering pad may have holes. The shape of the soldering pads and the shape and position of the holes can be adjusted according to actual needs to meet the requirements of different creepage distances, costs, and characteristics of the light source boards. Therefore, the lighting device can be more comprehensive in application and more flexible in use.

(5) In one embodiment of the present invention, the lighting device can be realized through a simple structural design, thus achieving the desired effect while reducing costs. Therefore, the lighting device can attain high practicality to satisfy the needs of different users.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
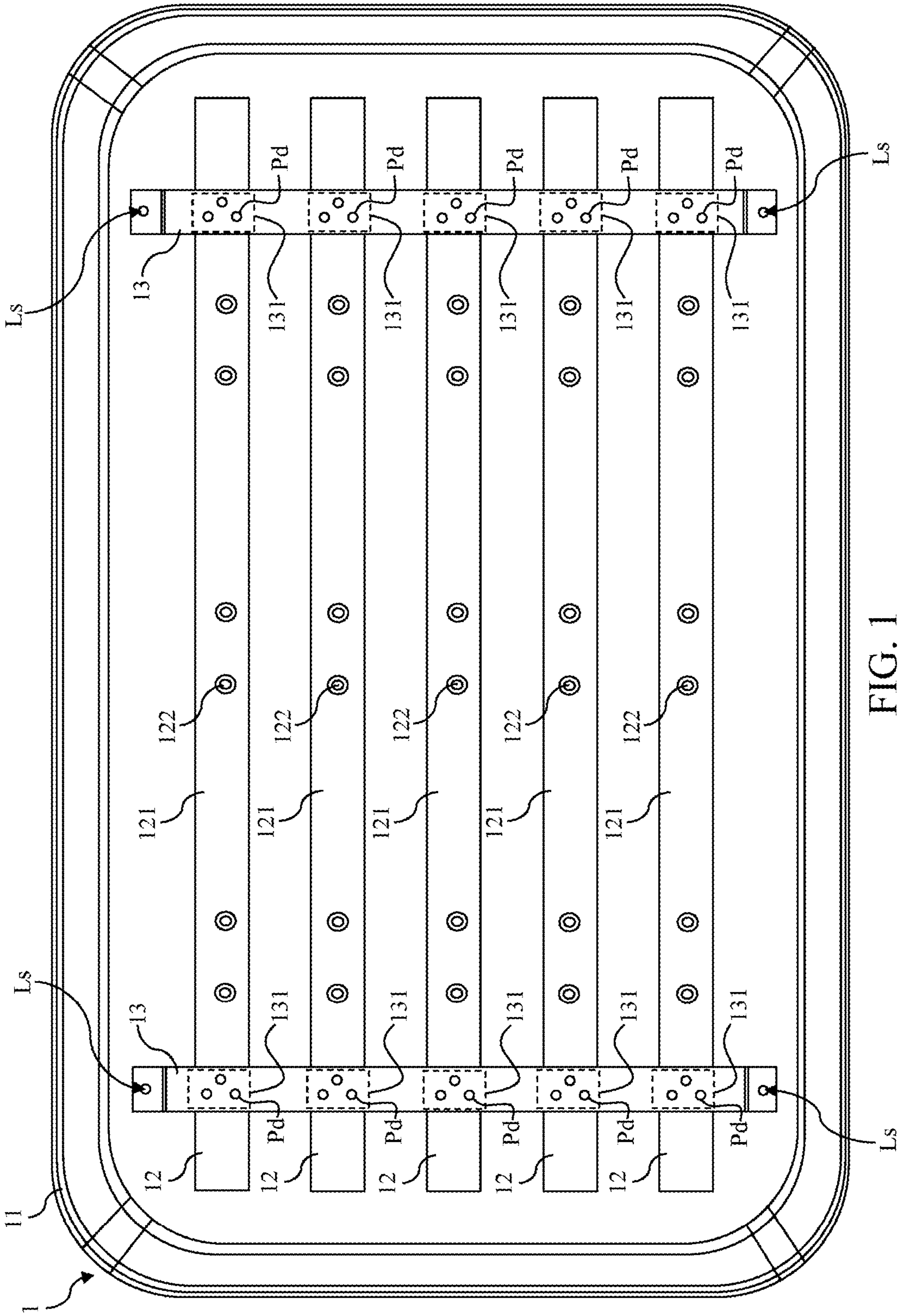
FIG. 1 is the schematic view of the lighting device with the flexible circuit board connection structure in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
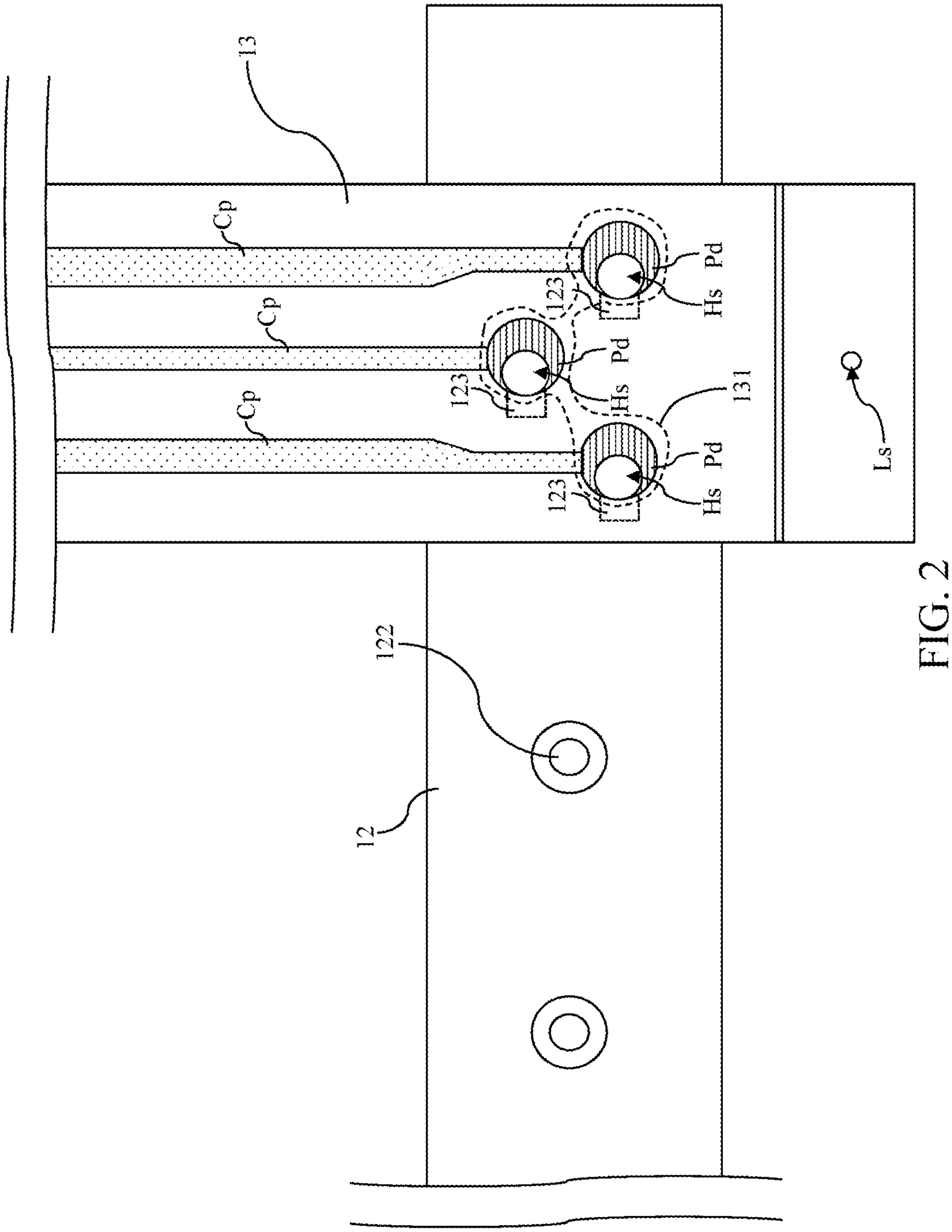
FIG. 2 is the partial enlargement view of the lighting device with the flexible circuit board connection structure in accordance with the first embodiment of the present invention.

Please refer to FIG. 1 and FIG. 2. FIG. 1 is the schematic view of the lighting device with the flexible circuit board connection structure in accordance with the first embodiment of the present invention. FIG. 2 is the partial enlargement view of the lighting device with the flexible circuit board connection structure in accordance with the first embodiment of the present invention. As shown in FIG. 1 and FIG. 2, the lighting device 1 includes a backboard 11, a plurality of lighting source boards 12, and a flexible circuit board 13.

One side of the backboard 11 has an accommodating space. The lighting source boards 12 can be fixed on one side of the backboard 11 and disposed within this accommodating space. In this embodiment, the number of the lighting source boards 12 is five, but this is not limited. Each lighting source board 12 includes a circuit board 121, a plurality of light sources 122, and a plurality of electrodes 123. These electrodes 123 and light sources 122 are disposed on the circuit board 121. In this embodiment, the number of the light sources 122 is six and the number of the electrodes 123 is two, but this is not limited. The lighting device 1 also includes a light diffusion board (not shown in the figures), which covers the accommodating space. In this embodiment, the light sources 122 are light-emitting diodes (LEDs). In another embodiment, the light sources 122 could also be LED arrays or other similar components.

The flexible circuit board 13 includes a plurality of soldering structures 131 and two hanging holes Ls, which are respectively disposed at both ends of the flexible circuit board 13. In this embodiment, the number of the soldering structures 131 is ten, but this is not limited. The soldering structures 131 correspond to the lighting source boards 12. Each soldering structure 131 includes a plurality of soldering pads Pd and a plurality of copper foils Cp. The number of the soldering pads Pd is three, but this is not limited. The soldering pads Pd are connected to a power supply via the copper foils Cp, and the power supply is connected to an external power source (such as utility power). The electrodes 123 of each lighting source board 12 are soldered to the corresponding soldering pads Pd of the soldering structure 131. In this embodiment, the boundary of the soldering pad Pd is circular and the soldering pad Pd has a hole Hs, which is circular and in contact with the boundary of the soldering pad Pd. Therefore, the shape of the soldering pad Pd is crescent-shaped. The connection of the soldering pads Pd form a triangle. In this embodiment, the diameter of the soldering pad Pd is 3.5 mm; the diameter of the hole Hs is 2 mm, and the offset distance between the hole Hs and the center of the soldering pad Pd is 0.8 mm. In another embodiment, the hole Hs could also be semi-circular, oval, capsule-shaped, or other similar shapes. These parameters are merely examples instead of limitations and can be adjusted as needed.

The structural design of the crescent-shaped soldering pads Pd with holes Hs can meet the requirement of creepage distance (the creepage distance between the copper foils Cp of the flexible circuit board 13 and the board edge is not less than 3.5 mm). Therefore, the lighting device 1 can achieve high efficiency.

As set forth above, the lighting device 1 includes a backboard 11, a plurality of lighting source boards 12, and a flexible circuit board 13. The lighting source boards 12 are fixed on one side of the backboard 11, and each lighting source board 12 includes a plurality of electrodes 123. The flexible circuit board 13 includes a plurality soldering structures 131. These soldering structures 131 of correspond to the lighting source boards 12, and each soldering structure 131 includes a plurality of soldering pads Pd. The electrodes 123 of each lighting source board 12 are soldered to the corresponding soldering pads Pd of the soldering structure 131. Through the flexible circuit board connection structure, the flexible circuit board 13 and the soldering structures 131 thereof can be standardized to achieve automated production, which can significantly improve process efficiency and effectively reducing manpower costs. Additionally, the lighting device 1 can be mass-produced to meet actual requirements. Furthermore, since the process of the lighting device 1 can be greatly simplified, the yield of the manufacturing process of the lighting device 1 can be greatly improved through the flexible circuit board connection structure.

The connection structure of the three soldering pads Pd in the aforementioned embodiment can be achieved by changing the circuits of the lighting source board 12 and the flexible circuit board 13 to achieve different switching modes of the light sources 122, thereby providing different color temperatures. Thus, the lighting device 1 can provide different color temperatures to meet various application needs.

The embodiment just exemplifies the present invention and is not intended to limit the scope of the present invention; any equivalent modification and variation according to the spirit of the present invention is to be also included within the scope of the following claims and their equivalents.

Figure 3:
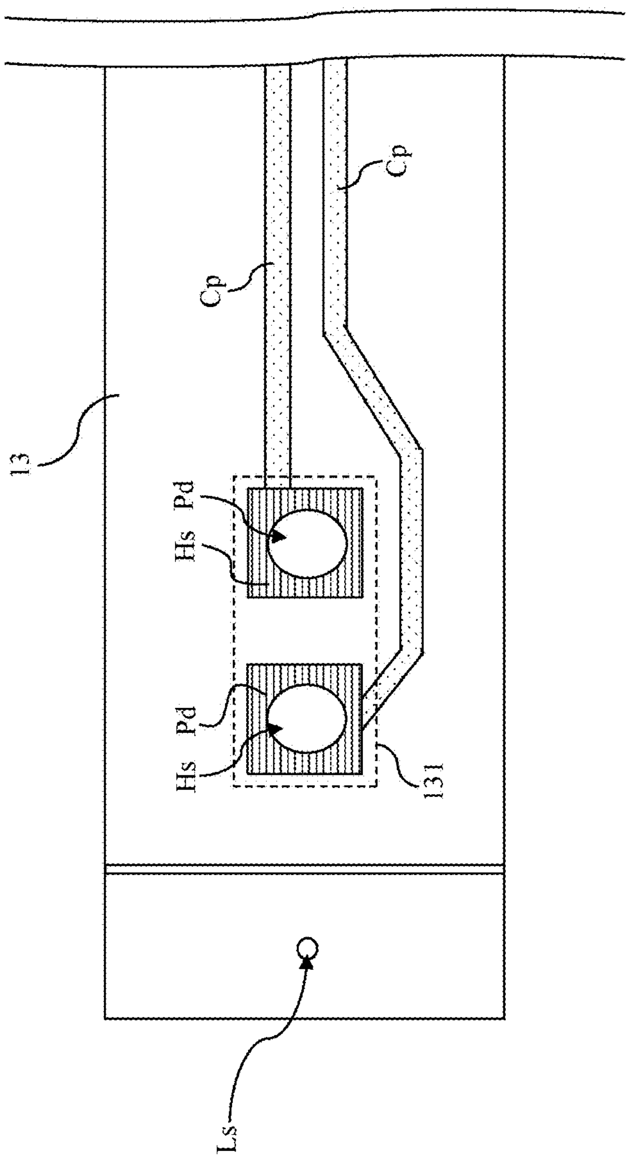
FIG. 3 is the partial enlargement view of the flexible circuit board of the lighting device with the flexible circuit board connection structure in accordance with the second embodiment of the present invention.

Please refer to FIG. 3, which is the partial enlargement view of the flexible circuit board of the lighting device with the flexible circuit board connection structure in accordance with the second embodiment of the present invention. As shown in FIG. 3, the number of the soldering pads Pd is two, but this is not limited. The boundary of the soldering pad Pd is rectangular (such as square, rectangular, etc.) and the soldering pad Pd has a hole Hs. The hole Hs are disposed at the center of the soldering pad Pd and are capsule-shaped. In another embodiment, the hole Hs could also be oval, circular, semi-circular, or other similar shapes. In this embodiment, the dimension of the soldering pad Pd is 3.2 mm by 3.5 mm; the dimension of the hole Hs is 2.5 mm by 2 mm (2.5 mm and 2 mm are the lengths of the two central axes). These parameters are merely examples instead of limitations and can be adjusted as needed.

The structural design of the rectangular soldering pads Pd with holes Hs can meet the requirements of monochromatic lighting source boards 12. Therefore, the lighting device 1 can achieve high efficiency.

The embodiment just exemplifies the present invention and is not intended to limit the scope of the present invention; any equivalent modification and variation according to the spirit of the present invention is to be also included within the scope of the following claims and their equivalents.

Figure 4:
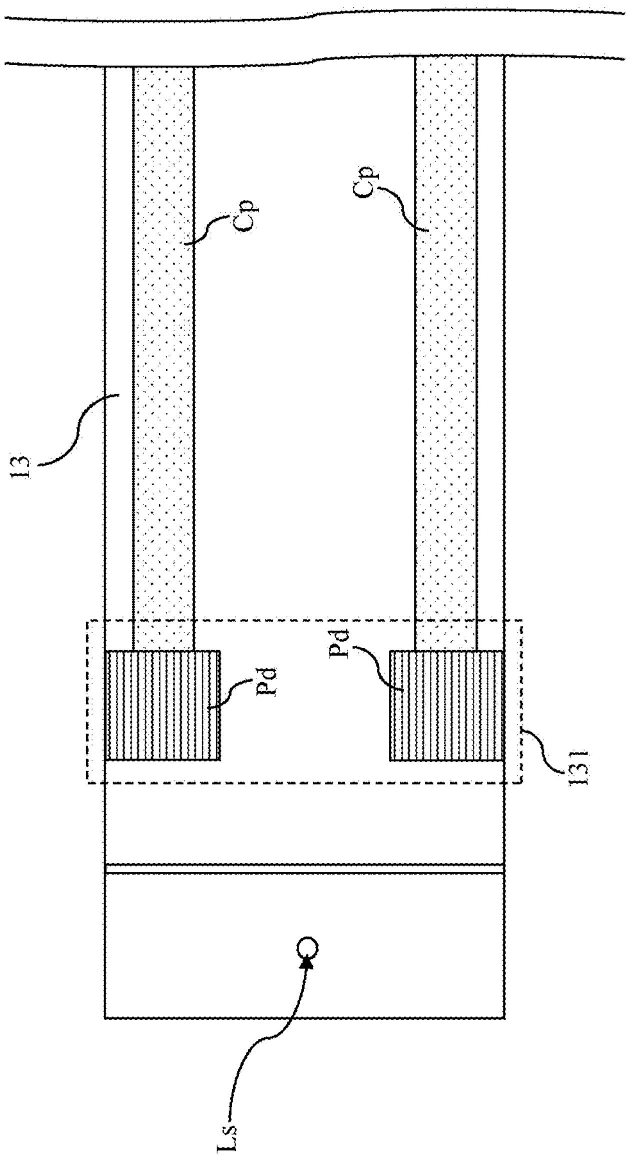
FIG. 4 is the partial enlargement view of the flexible circuit board of the lighting device with the flexible circuit board connection structure in accordance with the third embodiment of the present invention.

Please refer to FIG. 4, which is the partial enlargement view of the flexible circuit board of the lighting device with the flexible circuit board connection structure in accordance with the third embodiment of the present invention. This embodiment illustrates one of the structural designs of the flexible circuit board. As shown in FIG. 4, the flexible circuit board 13 has two soldering pads Pd, but this is not limited. The soldering pads Pd are square (the boundary of the soldering pads Pd is also square). In another embodiment, the soldering pad Pd could also be rectangular, circular, semi-circular, oval, capsule-shaped, or other similar shapes. In this embodiment, the dimension of the soldering pad Pd is 2 mm by 2 mm. These parameters are merely examples instead of limitations and can be adjusted as needed.

The structural design of the rectangular soldering pads Pd can be suitable for situations without creepage requirements. Therefore, the lighting device 1 can achieve high efficiency.

The embodiment just exemplifies the present invention and is not intended to limit the scope of the present invention; any equivalent modification and variation according to the spirit of the present invention is to be also included within the scope of the following claims and their equivalents.

It is worthy to point out that the light source boards of currently available LED (Light Emitting Diode) panel light mostly use wire bonding for connections. However, this connection method has some issues. Firstly, the manufacturing process has relatively low production efficiency and results in relatively high manpower costs. The soldering process in the above-mentioned method is relatively complex, which requires longer operation time and the involvement of highly skilled technicians. Secondly, the complexity of this process itself can easily lead to a lower yield rate of panel lights. Furthermore, due to the significant amount of manpower required, this manufacturing method not only imposes high demands on structural design but also makes it difficult to standardize the design, hindering large-scale production. By contrast, according to one embodiment of the present invention, the lighting device includes a backboard, a plurality of light source board, and a flexible circuit board. The light source boards are fixed to one side of the backboard, and each of the light source boards includes a plurality of electrodes. The flexible circuit board includes a plurality of soldering structures corresponding respectively to the light source boards, and each of the soldering structures includes a plurality of soldering pads. The electrodes of each of the light source boards are respectively soldered to the soldering pads of the soldering structure corresponding thereto. Via the flexible circuit board connection structure, both the flexible circuit board and the soldering structures thereof can be standardized to achieve automated production with a view to significantly improving process efficiency and effectively reducing manpower costs.

Also, according to one embodiment of the present invention, the lighting device has a flexible circuit board connection structure, and both the flexible circuit board and the soldering structures thereof can be standardized. Therefore, automated production can be achieved, which can effectively reduce the manpower required for the process. Thus, the lighting device can achieve large-scale production to meet actual requirements.

Further, according to one embodiment of the present invention, the lighting device has a special flexible circuit board connection structure and the design of the structure is simple, such that several light source boards can be interconnected through one or more flexible circuit boards. In this way, the manufacturing process of the lighting device can be greatly simplified. Therefore, via the flexible circuit board connection structure, the yield rate of the lighting device's manufacturing process can be significantly improved.

Moreover, according to one embodiment of the present invention, the flexible circuit board of the lighting device has a plurality of soldering structures. Each soldering structure has a plurality of soldering pads, and each soldering pad may have holes. The shape of the soldering pads and the shape and position of the holes can be adjusted according to actual needs to meet the requirements of different creepage distances, costs, and characteristics of the light source boards. Therefore, the lighting device can be more comprehensive in application and more flexible in use.

Furthermore, according to one embodiment of the present invention, the lighting device can be realized through a simple structural design, thus achieving the desired effect while reducing costs. Therefore, the lighting device can attain high practicality to satisfy the needs of different users. As set forth above, the lighting device with the flexible circuit board connection structure according to the embodiments of the present invention can definitely achieve great technical effects.

Figure 5:
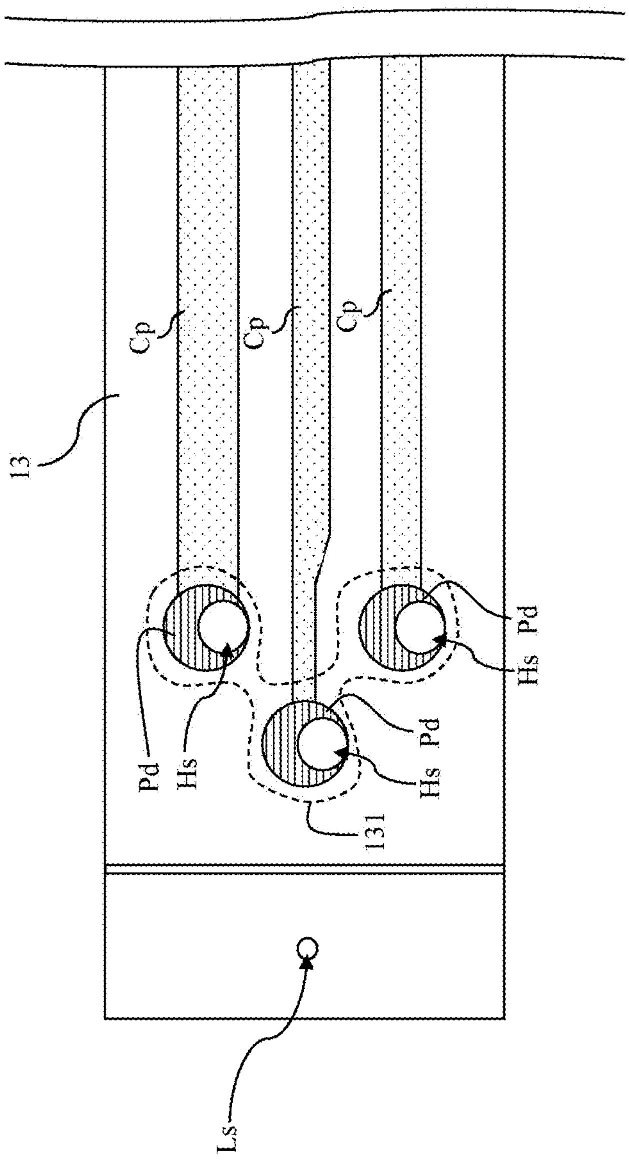
FIG. 5 is the partial enlargement view of the flexible circuit board of the lighting device with the flexible circuit board connection structure in accordance with the fourth embodiment of the present invention.

Please refer to FIG. 5, which is the partial enlargement view of the flexible circuit board of the lighting device with the flexible circuit board connection structure in accordance with the fourth embodiment of the present invention. This embodiment illustrates one of the structural designs of the flexible circuit board. As shown in FIG. 5, the flexible circuit board 13 has three soldering pads Pd, but this is not limited. The boundary of the soldering pad Pd is circular and the soldering pad Pd has a hole Hs. The hole Hs is circular and in contact with the boundary of the soldering pad Pd. Therefore, the shape of the soldering pad Pd is crescent-shaped. The connection of the soldering pads Pd form a triangle. In another embodiment, the shape of the hole Hs could also be oval, semi-circular, or other similar shapes. In this embodiment, the distance between the two right-side soldering pads Pd is 2 mm; the distance between any one of the right-side soldering pads Pd and the left-side soldering pad Pd is 2.4 mm; the distance between any one of the right-side soldering pads Pd and the boundary of the flexible circuit board 13 is 3.5 mm; the width of the flexible circuit board 13 is 16.5 mm; and the width of the lighting source board 12 is 16.5 mm. These parameters are merely examples instead of limitations and can be adjusted as needed.

The structural design of the soldering pads Pd and the flexible circuit board 13 can meet the requirements of multi-color temperature lighting source boards 12. Therefore, the lighting device 1 can achieve high efficiency.

The embodiment just exemplifies the present invention and is not intended to limit the scope of the present invention; any equivalent modification and variation according to the spirit of the present invention is to be also included within the scope of the following claims and their equivalents.

Figure 6:
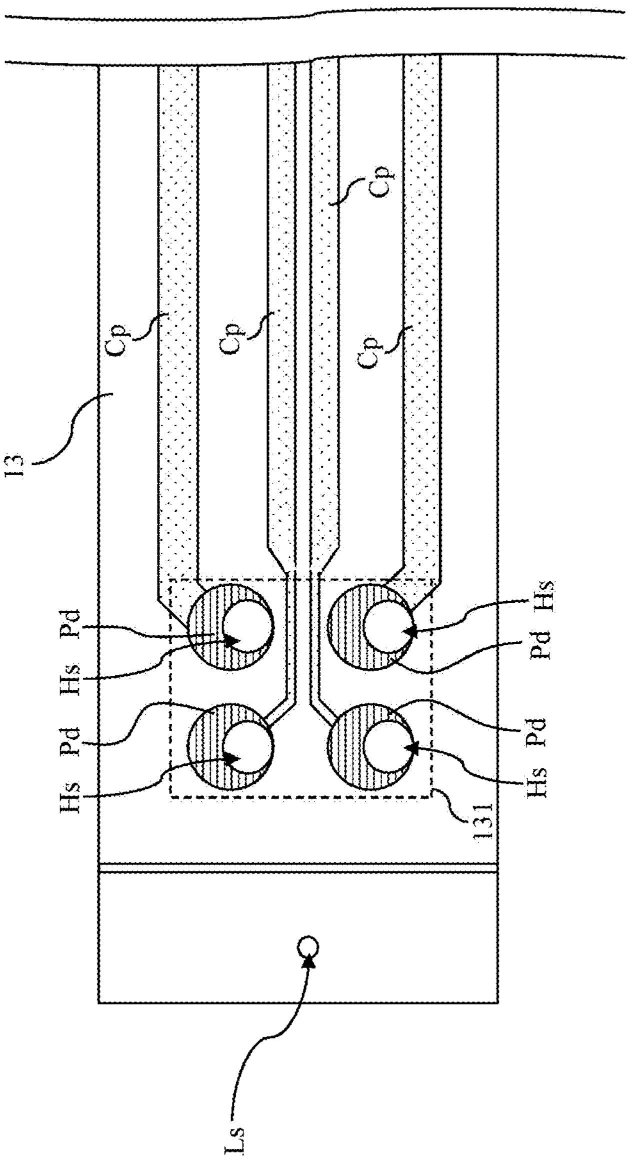
FIG. 6 is the partial enlargement view of the flexible circuit board of the lighting device with the flexible circuit board connection structure in accordance with the fifth embodiment of the present invention.

Please refer to FIG. 6, which is the partial enlargement view of the flexible circuit board of the lighting device with the flexible circuit board connection structure in accordance with the fifth embodiment of the present invention. This embodiment illustrates one of the structural designs of the flexible circuit board. As shown in FIG. 6, the flexible circuit board 13 has four soldering pads Pd, but this is not limited. The boundary of the soldering pad Pd is circular and the soldering pad Pd has a hole Hs. The hole Hs is circular and in contact with the boundary of the soldering pad Pd. Therefore, the shape of the soldering pads Pd is crescent-shaped. The connection of the soldering pads Pd form a rectangle. In another embodiment, the shape of the t holes Hs could also be oval, semi-circular, or other similar shapes. In this embodiment, the distance between the two right-side soldering pads Pd is 2 mm; the distance between the two left-side soldering pads Pd is 2 mm; the distance between any one of the right-side soldering pads Pd and the adjacent left-side soldering pad Pd is 1.7 mm; the distance between any one of the right-side soldering pads Pd and the boundary of the flexible circuit board 13 is 4.5 mm; the distance between any one of the left-side soldering pads Pd and the boundary of the flexible circuit board 13 is 4.5 mm; the width of the flexible circuit board 13 is 16.5 mm; and the width of the lighting source board 12 is 16.5 mm. These parameters are merely examples instead of limitations and can be adjusted as needed.

The structural design of the soldering pads Pd and the flexible circuit board 13 can meet the requirements of multi-color temperature lighting source boards 12. Therefore, the lighting device 1 can achieve high efficiency.

The connection structure of the three soldering pads Pd or four soldering pads Pd in the aforementioned embodiments can be achieved by changing the circuits of the lighting source board 12 and the flexible circuit board 13 to achieve different switching modes of the light sources 122 in order to provide different color temperatures. Thus, the lighting device 1 can provide different color temperatures to meet various application needs.

The embodiment just exemplifies the present invention and is not intended to limit the scope of the present invention; any equivalent modification and variation according to the spirit of the present invention is to be also included within the scope of the following claims and their equivalents.

Figure 7:
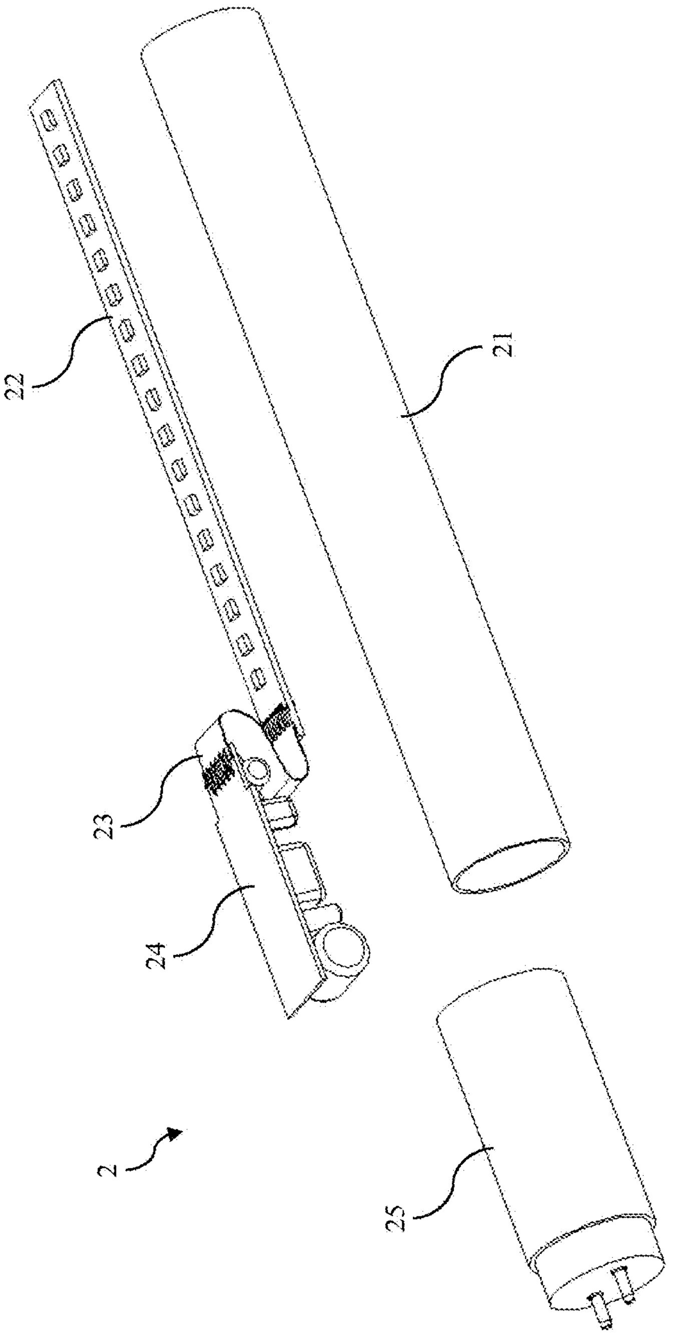
FIG. 7 is the exploded view of the lighting device with the flexible circuit board connection structure in accordance with the sixth embodiment of the present invention.

Please refer to FIG. 7, which is the exploded view of the lighting device with the flexible circuit board connection structure in accordance with the sixth embodiment of the present invention. As shown in FIG. 7, the lighting device 2 is a light tube, which includes a cylindrical light cover 21, a lighting source board 22, a flexible circuit board 23, a driver 24 and an end cap 25.

The light source board 22 is disposed in the cylindrical light cover 21 and includes a plurality of electrodes. The structure of the light source board 22 is the same with that of the previous embodiments, so will not be described herein again.

The flexible circuit board 23 includes a soldering structure corresponding to the light source board 22. The soldering structure includes a plurality of soldering pads.

The end cap 25 is disposed at one end of the cylindrical light cover 21. In another embodiment, the lighting devices 2 can include two end caps 25 respectively disposed at the two ends of the cylindrical light cover 21.

The driver 24 is disposed in the end cap 25 and electrically connected to the light source board 22 via the flexible circuit board 23.

The electrodes of the light source board 22 are respectively soldered to the soldering pads of the soldering structure. The structures of the electrodes, the soldering structure and the soldering pads are the same with the those of the previous embodiments, so will not be described herein again.

As set forth above, the flexible circuit board connection structure can be also applied to a light tube.

The embodiment just exemplifies the present invention and is not intended to limit the scope of the present invention; any equivalent modification and variation according to the spirit of the present invention is to be also included within the scope of the following claims and their equivalents.

Figure 8:
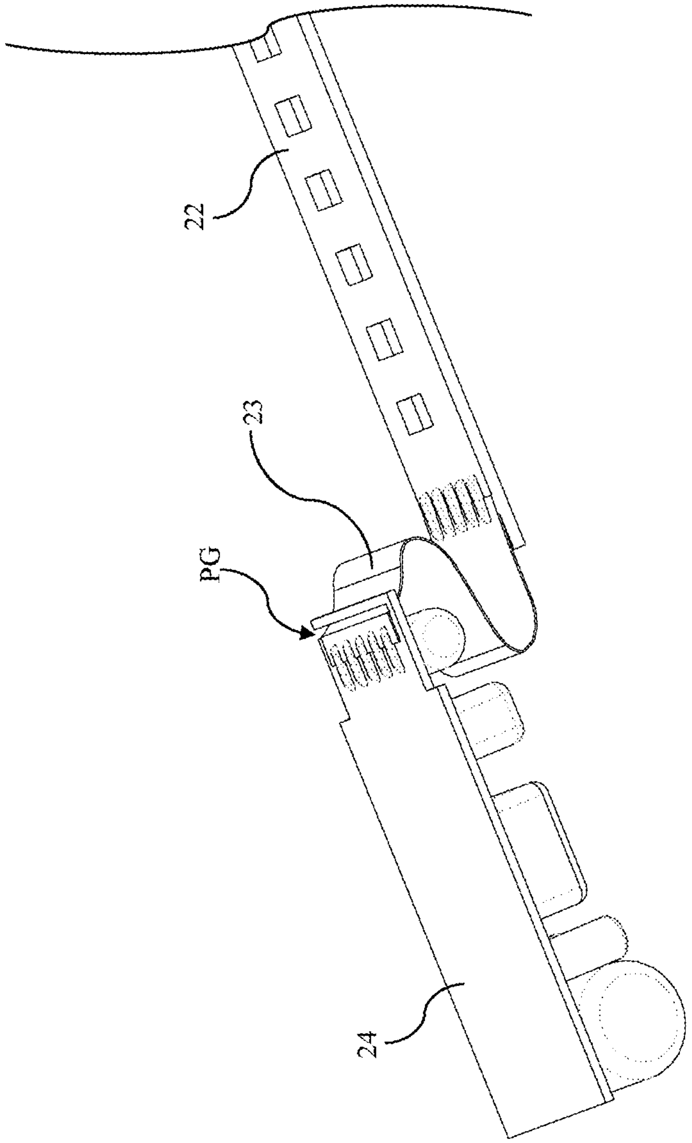
FIG. 8 is the partial enlargement view of the lighting device with the flexible circuit board connection structure in accordance with the seventh embodiment of the present invention.

Please refer to FIG. 8, which is the partial enlargement view of the lighting device with the flexible circuit board connection structure in accordance with the seventh embodiment of the present invention. As shown in FIG. 8, the difference of this embodiment and the previous embodiment is that the circuit board of the drive 24 has a groove PG. The flexible circuit board 23 can pass through the groove PG to be electrically connected to the driver 24, such that the driver 24 can be electrically connected to the light source board 22 via the flexible circuit board 23.

The above special-designed groove structure can provide an effective position-limiting effect, such that the flexible circuit board 23 can be stably fixed with the driver 24. Besides, the above special-designed groove structure can effectively reduce the stress applied to the flexible circuit board 23 during the installation process so as to avoid that the soldering points are damaged accordingly. In addition, the above special-designed groove structure can effectively prevent from the of defective soldering conditions. In this way, the quality and reliability of the lighting device 2 can be greatly enhanced.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a backboard, a plurality of light source board, and a flexible circuit board. The light source boards are fixed to one side of the backboard, and each of the light source boards includes a plurality of electrodes. The flexible circuit board includes a plurality of soldering structures corresponding respectively to the light source boards, and each of the soldering structures includes a plurality of soldering pads. The electrodes of each of the light source boards are respectively soldered to the pads of the soldering structure corresponding thereto. Via the flexible circuit board connection structure, both the flexible circuit board and the soldering structures thereof can be standardized to achieve automated production with a view to significantly improving process efficiency and effectively reducing manpower costs.

Also, according to one embodiment of the present invention, the lighting device has a flexible circuit board connection structure, and both the flexible circuit board and the soldering structures thereof can be standardized. Therefore, automated production can be achieved, which can effectively reduce the manpower required for the process. Thus, the lighting device can achieve large-scale production to meet actual requirements.

Further, according to one embodiment of the present invention, the lighting device has a special flexible circuit board connection structure and the design of the structure is simple, such that several light source boards can be interconnected through one or more flexible circuit boards. In this way, the manufacturing process of the lighting device can be greatly simplified. Therefore, via the flexible circuit board connection structure, the yield rate of the lighting device's manufacturing process can be significantly improved.

Moreover, according to one embodiment of the present invention, the flexible circuit board of the lighting device has a plurality of soldering structures. Each soldering structure has a plurality of soldering pads, and each soldering pad may have holes. The shape of the soldering pads and the shape and position of the holes can be adjusted according to actual needs to meet the requirements of different creepage distances, costs, and characteristics of the light source boards. Therefore, the lighting device can be more comprehensive in application and more flexible in use.

Furthermore, according to one embodiment of the present invention, the lighting device can be realized through a simple structural design, thus achieving the desired effect while reducing costs. Therefore, the lighting device can attain high practicality to satisfy the needs of different users.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device with a flexible circuit board connection structure, comprising:

a backboard;

a plurality of light source boards fixed to one side of the backboard, wherein each of the light source boards comprises a plurality of electrodes, a circuit board and a plurality of light sources, and the electrodes and the light sources are disposed on the circuit board; and a flexible circuit board comprising a plurality of soldering structures corresponding respectively to the light source boards, wherein each of the soldering structures comprises a plurality of soldering pads;

wherein the electrodes of each of the light source boards are respectively soldered to the soldering pads of the soldering structure corresponding thereto.

2. The lighting device with the flexible circuit board connection structure as claimed in claim 1, wherein a boundary of the soldering pad is circular and the soldering pad has a hole, wherein the hole contacts the boundary of the soldering pad, and the soldering pad is crescent-shaped.

3. The lighting device with the flexible circuit board connection structure as claimed in claim 2, wherein the hole is circular, semicircular, elliptical, or capsule-shaped.

4. The lighting device with the flexible circuit board connection structure as claimed in claim 1, wherein a boundary of the soldering pad is rectangular and the soldering pad has a hole, wherein the hole is disposed at a center of the soldering pad.

5. The lighting device with the flexible circuit board connection structure as claimed in 4, wherein the hole is circular, semicircular, or elliptical.

6. The lighting device with the flexible circuit board connection structure as claimed in claim 4, wherein the hole is capsule-shaped.

7. The lighting device with the flexible circuit board connection structure as claimed in claim 1, wherein the soldering pad is rectangular.

8. The lighting device with the flexible circuit board connection structure as claimed in claim 1, wherein a number of the soldering pads in each of the soldering structures is three, and a connection of center points of the soldering pads forms a triangle.

9. The lighting device with the flexible circuit board connection structure as claimed in claim 1, wherein a number of soldering pads in each of the soldering structures is four, and a connection of center points of the soldering pads forms a rectangle.

* * * * *